Figure 3:
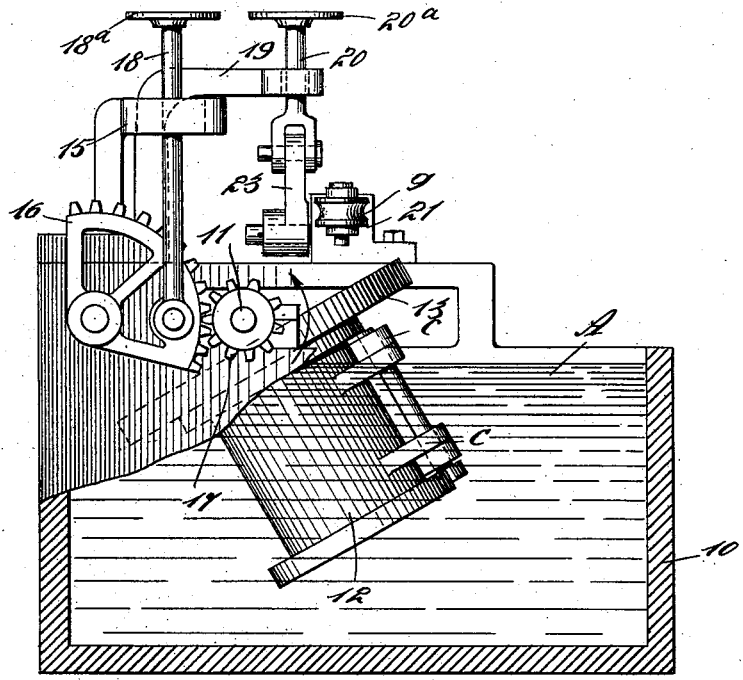

UNITED STATES PATENT OFFICE.

PERCY L. CLARK, OF CHICAGO, ILLINOIS.

PROCESS OF DEVULCANIZING RUBBER.

SPECIFICATION forming part of Letters Patent No. 601,091, dated March 22, 1898.

Application filed August 25, 1897. Serial No. 649,544. (No specimens.)

*To all whom it may concern:*

Be it known that I, PERCY L. CLARK, a citizen of the United States, residing at Chicago, county of Cook, and State of Illinois, have invented certain new and useful Improvements in the Process of Devulcanizing Rubber, which are fully set forth in the following specification, reference being had to the accompanying drawing, forming a part thereof.
The purpose of this invention is to deprive vulcanized rubber of its vulcanized character and adapt it for remolding or other reshaping and for vulcanizing in new form. By experiment I have ascertained that the essential conditions for the attainment of this purpose are the following: first, the employment of a solvent of rubber and sulfur whose boiling or vaporizing point is lower than the point at which rubber is disorganized by heat, which is commonly spoken of as the "melting-point" and which with different grades of rubber varies from a point somewhat below 300° Fahrenheit to a point several degrees above 300° Fahrenheit; second, soaking the vulcanized rubber thoroughly in such solvent; third, maintaining the rubber in a soaked or approximately-saturated condition while exposing it to heat sufficient to vaporize the solvent; fourth, avoiding a degree of heat sufficient to disorganize the rubber.

The best method which I have found for practicing this invention consists in first soaking the rubber thoroughly in such a solvent as gasolene, benzene, or any common grade of naphtha, though I have used kerosene in connection with the more volatile of these oils. The rubber thus soaked I immediately expose to a vapor of a similar solvent, gasolene being the most convenient and satisfactory for this purpose. The chamber being closed, I apply heat sufficient to vaporize the solvent in the chamber and thus completely envelop the rubber which is soaked with solvent, and I have obtained the best results by using such quantity of the solvent in the chamber that considerable pressure may be developed from the vapor of the solvent by a temperature below the disorganizing or melting point of rubber. The exposure of the saturated rubber in the vapor of the solvent at a temperature which in my experiments has varied from 200° to 300° Fahrenheit and sometimes a little above for a period of time which has varied from one hour to three hours and with an indicated pressure ranging from one pound up to one hundred pounds, results in reducing the rubber to a condition which I call "devulcanized," because in that condition it has substantially the qualities of the original unvulcanized rubber with which sulfur has been mixed for the purpose of vulcanization—that is, it can be massed together and sheeted out between rolls and upon being exposed to a proper degree of heat becomes again vulcanized. When this condition is attained, the rubber is removed from the vapor and after a short cooling can be handled and worked.

The apparatus which I have used for the practice of my invention is shown in the drawing, in which the figure is an actual section through two chambers which comprise the apparatus.

In the drawing, A is a chamber to which a proper solvent may be supplied through a pipe $A'$, controlled by a valve $A^2$. This chamber is inclosed in a steam-jacket B, through which steam for heating is supplied through a pipe $B'$, controlled by the valve $B^2$.

$B^3$ is a drain-cock for the water of condensation. The chamber A has connected with it a thermometer C, adapted for indicating the interior temperature—that is, the temperature of the vaporized solvent.

E is a pressure-gage connected with the vapor-chamber. At the center of the top is a hand-hole $A^3$, provided with a tight cover $A^4$, and within the chamber, adapted to be inserted through the hand-hole and suitably suspended, is a wire cage F to contain the rubber articles to be treated. From the upper end of the chamber a pipe G leads to a condensing-coil $G'$, which is inclosed in a cooling-chamber H, supplied with water through a pipe $H'$, and having a waste-pipe $H^2$, so that water may be caused to circulate through the chamber to cool the coil $G'$. The coil drains into a receptacle J. A valve $G^2$ controls the pipe G.

No especial apparatus need be illustrated for the purpose of soaking the rubber in the solvent. Any vessel, preferably with a tight cover, will answer the purpose.

The length of time necessary to properly soak the rubber before putting it into the va- (No Model.)  
2 Sheets—Sheet 2.

L. H. DOLAN.
PASTE MOLD MACHINE.

No. 601,092. Patented Mar. 22, 1898.

WITNESSES:  
John A. Bergstrom  
Wm. P. Patton

INVENTOR  
L. H. Dolan  
BY  
ATTORNEYS.

UNITED STATES PATENT OFFICE.

LAWRENCE H. DOLAN, OF ALEXANDRIA, INDIANA, ASSIGNOR OF ONE-HALF TO VALENTINE LIBLER, OF SAME PLACE.

PASTE-MOLD MACHINE.

SPECIFICATION forming part of Letters Patent No. 601,092, dated March 22, 1898.

Application filed May 29, 1897. Serial No. 638,737. (No model.)

*To all whom it may concern:*

Be it known that I, LAWRENCE H. DOLAN, of Alexandria, in the county of Madison and State of Indiana, have invented a new and Improved Paste-Mold Machine, of which the following is a full, clear, and exact description.

This invention relates to a novel glass-molding machine of a type wherein a separable mold is employed and in which the hollow article to be produced from the molten glass is blown while the mold is closed and is released from the mold when the mold is opened.

The object of my invention is to produce a paste-mold of the indicated character which will be adapted for the rapid and perfect production of electrolier-bulbs or other hollow glassware by a workman without requiring an assistant.

The invention consists, essentially, in a two-part closable mold, a douche-tank, means for moving the mold into and out of the tank by pressure of the foot of the operator, and means for closing the normally open mold also by foot-pressure.

The invention further consists in the novel construction and combination of parts, as is hereinafter described, and pointed out in the claims.

Reference is to be had to the accompanying drawings, forming a part of this specification, in which similar characters of reference indicate corresponding parts in all the figures.

Figure 1 is a front elevation of the improved paste-mold machine. Fig. 2 is a plan view of the same. Fig. 3 is a side elevation seen in the direction of the arrow $x$ in Fig. 2, one of the side walls of the douche-tank being broken away to expose the submerged mold; and Fig. 4 is a detached plan view of the two-part paste-mold and a part of the shaft whereon said mold is held to rock, the mold being shown in opened adjustment.

In the drawings representing an embodiment of the invention, 10 indicates a water-holding receptacle or douche-tank, which is preferably rectangular and is proportioned in capacity to receive and permit a free submersion of the paste-mold. A shaft 11 is supported transversely on the douche-tank and is journaled near its ends in boxes $a$ or equivalent supports.

The paste-mold consists of two sections 12 $12^a$, which may be of equal size and like form. The two-part mold-sections 12 $12^a$ are hollowed out on their meeting edges to provide a matrix for shaping the article to be blown therein. In case the glass article to be manufactured is of cylindric or bulb form the two matrix-cavities in the mold-sections are preferably made alike in form and depth, as shown at $b$ in Fig. 1.

Figure 4:
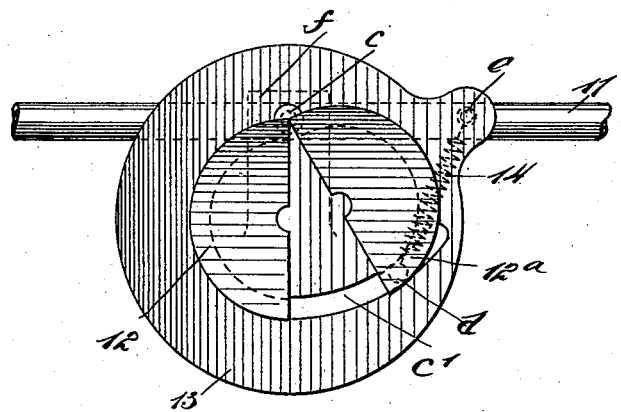

One mold-section, 12, is secured upon the base-plate 13, and the other section, $12^a$, is hinged to the fixed mold-section 12, as shown at $c$, Figs. 2, 3, and 4. The loose section $12^a$ of the paste-mold is provided with a projection $d$ at its lower end, which loosely engages with a curved slot $c'$ in the base-plate 13, whereby the free portion of the hinged mold-section is guided, and on the portion of the projection or stud $d$ which extends below the base-plate 13 one end of a spring 14 is secured, the other end of the spring being attached to a projection $e$ on the base-plate. The spring 14 by its contraction holds the hinged mold-section $12^a$ swung away from the fixed mold-section 12. As shown, the meeting edges of the mold-sections 12 $12^a$ are longitudinal of said sections and preferably at right angles to the surface of the base-plate.

It is essential for the free operation of the improvements that the hinged mold-section $12^a$ be afforded a convex or cylindric form exteriorly.

To adapt the closed mold to receive the end of a glass-blower's pipe at one end of the matrix therein for the introduction of the molten glass which is to be shaped by the mold, said matrix is extended through the end of the two-part mold which is uppermost when the blowing operation is effected, as shown in Fig. 1.

On the rockable shaft 11 a lug $f$ is secured and projects from the lower side of the base-plate 13, so as to adapt the shaft to rock the two-part mold, and to enable the operator to control such a rocking movement of the mold for its depression within the douche-tank 10 and its removal therefrom simple means are provided, which will now be described.

On a covered portion of the tank 10, near one end of the same, an upright bracket-arm 15 is erected and secured and projects over and outside of one side of the tank. Below the outer end of the bracket-arm 15 a gear-segment 16 is pivoted on the side of the tank 10, and said gear-segment is meshed with a pinion 17, secured upon one end of the rocking shaft 11. The laterally-projecting upper portion of the bracket-arm 15 is vertically apertured to receive the loosely-fitting stem of the upright pusher-bar 18, provided on its upper end with a foot-piece 18$^a$, the lower end of the pusher-bar being pivoted to the segmental gear 16 near its toothed edge.

It will be evident that upon applying foot-pressure to the upper end of the pusher-bar 18 the shaft 11 will be rocked in the direction of the curved arrow in Fig. 3 and the paste-mold be elevated from a depending position, as shown in Fig. 3, to an upright position, as represented in Fig. 1.

To facilitate the closure of the hinged mold-section 12$^a$ against the stress of the spring 14, an L-shaped bracket-arm 19 is secured on the tank 10 near the side of the latter toward which the hinged mold section 12$^a$ rocks in opening. The outer end of the overhanging horizontal portion of the bracket-arm 19 is slotted vertically, and in said slot a pusher-bar 20 is loosely inserted, said bar having a foot-piece 20$^a$ on its upper end. On a suitable support 10$^a$, located on the upper side of the tank 10, a guide-box 21 is held which extends toward the paste-mold. In the guide-box 21 a slide-bar 22 is loosely held, which at its inner end has a roller $g$, designed to engage with the convex surface of the hinged mold-section 12$^a$.

On the rear side of the guide-box 21 a bell-crank 23 is pivoted, so that its nearly horizontal member may be jointed to the lower end of the pusher-bar 20.

A link 24 is pivoted at one end to the end of the upright member of the bell-crank 23 and the other end is pivotally connected with the outer end of the slide-bar 22. The stress of the spring 14 is sufficient to hold the hinged mold-section 12$^a$ open against the weight of the pusher-bar 20, so that the latter is normally elevated, as shown in Fig. 3.

Assuming that a proper quantity of liquid A is introduced within the douche-tank 10, the operation of glass-blowing is as follows: The workman, with the usual blowing-pipe, (not shown,) takes a charge of molten glass on the outer end of the tube. He at the same time raises the mold from the douche-tank 10 by foot-pressure on the pusher-bar 18. The molten glass is now gradually blown into the mold that is closed slowly upon the expanding glass bulb or other article the mold is capable of forming, and when the blowing operation is completed a perfect glass bulb will be formed on the end of the blowing-tube. The mold may now be opened to release the bulb, and at the same time or as soon as the bulb is taken from the mold the latter is dropped into the water in the tank, which is of a temperature suited to the work, so that the mold will be slightly cooled after each of the successive blowing operations.

Owing to the position given to the open section of the paste-mold when the mold is raised from the water the latter instantly drains from said mold and leaves it dry, which insures the perfect operation of the device as it is successively used.

It is obvious that by a substitution of molds any desired style of blown-glass articles within the practical range of the machine may be produced by the use of the improved paste-mold apparatus.

Having thus described my invention, I claim as new and desire to secure by Letters Patent—

1. The combination with a supported rock-shaft, of a two-part paste-mold, comprising a base-plate affixed on the shaft, a mold-section fixed on the base-plate, a mold-section hinged to the fixed section, a spring adapted to normally open the hinged mold-section, and means to close the hinged mold-section against stress of the spring, substantially as described.

2. The combination with a supported rock-shaft, a two-part mold thereon, one section of the mold being hinged to swing on the other section, and a spring adapted to open the hinged mold-section, of a bar held to slide on the shaft-support and adapted to loosely contact with the hinged mold-section, a slidable upright presser-bar, a rockable bell-crank pivoted by one end on the presser-bar, and a link pivotally connected with the remaining member of the bell-crank, and also with the outer end of the slide-bar, substantially as described.

3. The combination of a base-plate having a fixed mold-section thereon, and an arc-shaped slot therein, another section mounted on the base-plate and hinged to the fixed section, a projection attached to the hinged section and extending through the arc-shaped slot between the said projection and base-plate to hold the movable section normally open.

4. The combination with a support, of a base-plate held thereon, the base-plate having a stationary mold-section and an arc-shaped slot therein, another mold-section mounted on the base-plate, and hinged to the fixed section, a projection attached to the hinged mold-section and movable through the slot in the base-plate, a retractile spring between attached to the projection and base-plate, a bar reciprocally mounted on the support, a roller carried by the bar and capable of engaging the hinged mold-section, a bell-crank lever having connection with the bar whereby to reciprocate the same, and a push-bar having connection with the bell-crank lever.

5. The combination with a tank, of a sector mounted thereon, a push-bar connected with the sector, a rock-shaft mounted on the tank, a gear fixed to the rock-shaft and meshed with the sector, a base-plate carried by the rock-shaft and having a stationary mold-section, a hinged mold-section mounted on the base-plate and coacting with the stationary mold-section, a spring serving to keep the hinged mold-section normally in open position, a bar reciprocally mounted on the tank to close the hinged mold-section, a bell-crank lever also mounted on the tank and connected to the said bar, and a push-bar in connection with the bell-crank lever.

6. The combination with a tank, of a base-plate rockably mounted thereon and having a mold-section fixed thereon, a hinged mold-section mounted on the base-plate and hinged to the fixed section, a spring holding said hinged mold-section normally open, and a reciprocal bar mounted on the tank and capable of closing the hinged mold-section against the tension of its spring.

7. The combination with a tank, of two mold-sections mounted to rock thereon, one of said mold-sections being hinged to the other, a reciprocal bar mounted on the tank and capable of closing said hinged mold-section, a bell-crank lever in connection with said bar, and a push-bar in connection with the bell-crank lever.

LAWRENCE H. DOLAN.

Witnesses:
A. W. McLAUGHLIN,
HARVEY LEONARD.